United States Patent [19]

Koeppel

[11] 4,166,750

[45] Sep. 4, 1979

[54] ANHYDRITE CONCRETE AND METHOD FOR PREPARING BUILDING ELEMENTS

[75] Inventor: Robert Koeppel, Bron, France

[73] Assignee: Produits Chimiques Ugine Kuhlmann, Paris, France

[21] Appl. No.: 867,709

[22] Filed: Jan. 9, 1978

[30] Foreign Application Priority Data

Jan. 14, 1977 [FR] France ................................ 77 01016

[51] Int. Cl.$^2$ ............................................. C04B 11/00
[52] U.S. Cl. ................................................... 106/109
[58] Field of Search ................................ 106/109–111

[56] References Cited

U.S. PATENT DOCUMENTS

| 2,015,676 | 10/1935 | Heiser | 106/110 |
| 3,284,227 | 11/1966 | Gerton | 106/111 |
| 3,980,487 | 9/1976 | Akabayashi et al. | 106/111 |
| 4,059,456 | 11/1977 | DeRooy et al. | 106/111 |

Primary Examiner—James Poer
Attorney, Agent, or Firm—Pennie & Edmonds

[57] ABSTRACT

The invention disclosed is for a new anhydrite concrete prepared by combining suitable quantities of an anhydrite binder, at least one anhydrite setting catalyst, heavy granulates and water. The new anhydrite concrete may be readily molded into building elements such as blocks, case bays, and the like.

9 Claims, No Drawings

ANHYDRITE CONCRETE AND METHOD FOR PREPARING BUILDING ELEMENTS

BACKGROUND OF THE INVENTION

1. Field of the Invention

The present invention relates to a new anhydrite concrete prepared by mixing suitable quantities of an anhydrite binder, at least one anhydrite setting catalyst, heavy granulates and water. Building elements may be molded using the new anhydrite concrete by placing the mixture into a mold from which it is released and allowed to cure.

2. Description of the Prior Art

It has long been known to produce concrete based on Portland cement. However, products obtained using this material, under normal conditions of hardening in the air, often suffer significant shrinkage. This shrinkage which may extend over a year, is often the cause of cracking and powdering which often results in destruction of the material. One solution to correcting damage due to shrinkage is to store products during curing for a minimum period of 70 days, which necessitates considerable storage areas. If it is desired to avoid shrinkage and enhance the mechanical properties, it is necessary to resort, after partial hardening, to autoclave treatment lasting 12 to 24 hours at a temperature of 170° to 200° C. at a pressure of 8 to 10 atm. This treatment is particularly burdensome in terms of investment and power requirements.

It has now been found that by practice of the present invention, there is provided a new improved anhydrite concrete which is easily molded into building elements and which overcomes many of the defects of the prior art.

SUMMARY OF THE INVENTION

The present invention relates to a method of making building elements using non-shrinking anhydrite concrete prepared from suitable quantities of an anhydrite binder having good thermal and acoustic insulating properties, at least one anhydrite setting catalyst, heavy granulates and water.

DETAILED DESCRIPTION OF THE INVENTION

The anhydrite concrete of the present invention is prepared by combining 100 parts by weight of anhydrite binder, 20 to 75 parts by weight of water, 0.5 to 5 parts by weight of at least one anhydrite setting catalyst, and 300 to 900 parts by weight of heavy granulates.

The anhydrite binder used in preparing the present anhydrite concrete is an insoluble anhydrite such as anhydrous calcium sulphate, $CaSO_4$, commonly known as grade II or $\beta$. Insoluble anhydrites are well known and may vary in their origin. For example, the insoluble anhydrite may be either a natural anhydrite or the anhydrite produced as a by-product of the manufacture of hydrofluoric acid by sulphuric acid attack on calcium fluoride. The insoluble anhydrite can also be obtained by calcination of either natural gypsum or of by-product gypsums of the chemical industry. In particular, it is possible to use the anhydrite obtained by calcination of a phosphogypsum which is a by-product of the manufacture of phosphoric acid by the wet method. The method of producing such an anhydrite is described in French Patent Application No. 76,00678, filed Jan. 13, 1976, and counterpart U.S. application Ser. No. 756,861, filed Jan. 4, 1977, both of which are incorporated herein by reference.

In order to obtain a material having optimum properties, the anhydrite used according to this invention should be characterized by a granulometry having at least about 15% by weight of particles of a diameter less than about 10 $\mu$m and at least about 20% by weight of particles having a diameter larger than about 20 $\mu$m with an average diameter of between about 5 and 30 $\mu$m. The anhydrite which may be used is likewise characterized by a BLAINE [ASTM, Bull. No. 108, 17–20 (1941)] surface area between 1,000 and 8,000 sq.cm/g and preferably between 2,000 and 5,000 sq.cm/g.

The anhydrite binder as defined above permits the production of materials having remarkable mechanical properties. Indeed, when it is mixed in the presence of a suitable catalytic system such as potassium sulphate associated with lime or iron sulphate or zinc sulphate, this anhydrite yields at 28 days, according to the quantity of mixing water used, a bending strength of 90 to 150 bars and a compression strength of 400 to 800 bars, according to French standard NF P 15451, at a density of 2.0 to 2.3. The anhydrite binder as defined above is, therefore, very advantageous for the manufacture of concrete having good mechanical properties and substantially no shrinkage and a very low coefficient of thermal expansion.

In the preferred order of mixing, the anhydrite binder and water which may contain at least one anhydrite setting catalyst, are combined until uniformly blended. Thereafter, the heavy granules are added with mixing to ensure uniform distribution. The mixture is then poured into a mold, desirably under vibration, wherein the mixture sets under compression following which the molded article is removed and allowed to cure prior to being used as a building element.

At least one anhydrite setting catalyst is usefully included in forming the present anhydrite concrete. The anhydrite setting catalysts can be selected from a number of available catalysts known to the art, such as for example, either alkali or alkaline-earth metal sulphates, alums, nitrates, carbonates, and hydroxides. In order to obtain optimal mechanical properties, it is advantageous to use a binary catalytic system which may include an alkali metal sulphate such as potassium sulphate, combined with an alkaline-earth metal hydroxide, such as calcium hydroxide; or with a sulphate of a metal other than alkali or alkaline-earth, such as ferrous sulphate or zinc sulphate. The anhydrite setting catalyst may be introduced into the mixture in the form of dry powder, but it is preferable that it be introduced in the form of a solution and/or aqueous suspension in order to have a more homogeneous distribution within the mixture.

The heavy granulates useful herein may be any of a number of available materials such as silica sands, silico-calcareous sands, structural concrete, crushed or granulated slag, or the like. The granulometry of the heavy granulates is very important because it affects the flow qualities of the concrete and influences the rate at which molds are filled. The rate of mold filling is important since it must be compatible with industrial requirements. The granulometry of the heavy granulates also influences the rigidity of the molded articles after being removed from the mold and while curing when the fresh concrete must be self-sustaining without appreciable deformation. The granulometry of the heavy granulates also influences the mechanical properties of the finally cured building elements.

It has been found that the granulometry of the heavy granulates desirably range from greater than 0 to 15 mm. while having a substantially uniform particle size distribution.

The anhydrite concrete may be molded either as a specialty work or with automatic, high-production machines, mobile or fixed, in which the anhydrite concrete may be introduced into the mold under vibration, then compressed and unmolded immediately.

The building elements prepared using the anhydrite concrete of the present invention are homogeneous, non-reinforced, of general parallelopipedic form, and of such size that they can easily be handled when used, for construction of walls and partitions. The building elements can be solid or hollow, as desired, the hollow configuration containing air chambers disposed to reduce the overall heat conductivity of the building element.

Case bays are building elements having homogeneous, non-reinforced composition configurated in a wide variety of shapes, but always constituted by hollow chambers defined by internal partitions which are designed to connect prefabricated reinforced concrete joists of concrete floors with compression slabs poured on the site. The case bays are also commonly known by various designations in the art, such as hollow bodies, pugging, hollow pugging, or voussoirs.

It can be advantageous to include other ingredients in preparation of the anhydrite concrete of the present invention, in addition to those indicated previously. Useful ingredients include fluidizers, water-repellents, pigments, and the like.

The amount of water used may be reduced by addition of one or more fluidizers which make it possible to reduce the water content down to nearly one-third while retaining the same workability. It is thus possible to have more rapid drying and hardening and to obtain higher mechanical properties. The fluidizers which may be used are well known to those skilled in the art and of many varied types. The most effective fluidizers are resins of low molecular weight containing sulfonate groups such as the low molecular weight polystyrene-sulfonates, or low molecular weight condensates of formol, with naphthalene, phenol, urea, or melamine and carrying sulfonate groups. The amount of fluidizer that can be used is between about 0.1 and 2, and preferably 0.5 and 1 part by weight per 100 parts by weight of anhydrite binder.

It may also be advantageous to incorporate fibers of various types into the mixture to enhance the mechanical properties of the molded material. Good results are obtained with the majority of fibers which exist on the market, particularly with fibers of steel, asbestos, glass, vegetable fibers and the fibers of synthetic polymers such as polyamides, polyesters and polypropylene. The fibers may be used in proportions of the order of 0.1 to 5 parts by weight per 100 parts of mixture.

In order to render the finished material impermeable to water and atmospheric humidity, one or more water repellants may be introduced into the mixture. Numerous water repellants are available to the art and may be used in the present formulation such as potassium and sodium siliconates or vinyl and acrylic polymers and copolymers, particularly copolymers of the methyl methacrylate-butyl methacrylate and butyl acrylate type. These products may be used at the rate of 0.1 to 1 part by weight per 100 parts by weight of mixture.

Pigments may be used in the present formulation in amounts sufficient to render a suitable effect. Typically, these pigments may be metallic oxides and mineral pigments well known to the art.

It is advantageous to allow the setting and hardening of the anhydrite concrete to take place at a temperature close to 25° C. and at a relative humidity equal to at least 65%. These conditions permit building elements to be prepared having high mechanical strength properties which exhibit no dimensional shrinkage in the course of setting or hardening; they have lower coefficient of heat conductivity and lower coefficient of heat expansion than the corresponding building elements prepared using Portland cement.

The following examples are presented to illustrate practice of the present invention and should not be deemed as limiting the present invention. In all cases, unless otherwise indicated, all parts and percentages are by weight.

EXAMPLE 1

A concrete formulation was prepared by mixing 100 parts by weight of anhydrite obtained by calcination of phosphogypsum and having a BLAINE surface of 5,000 sq.cm./gm. with 1 part by weight of potassium sulphate, 1 part by weight of zinc sulphate heptahydrate, 200 parts by weight of 0/6 mm. siliceous sand, 200 parts by weight of 3/8 mm. siliceous sand and 34 parts by weight of water. This concrete formulation was molded in a fixed, automatic machine equipped with block molds. The molds were easily filled under vibration. After compression and unmolding, the fresh blocks having sufficient rigidity were carried to a storage area where the temperature was about 25° C. and the relative humidity was about 66%. The blocks can be handled 1 day after molding. The mechanical properties of the concrete used were determined according to French standard NF 15 451 (samples of 4×4×16 cm.). At 28 days, the test samples were found to have a bending strength of 45 bars and a compression of 253 bars.

EXAMPLE 2

The procedure of Example 1 was repeated except that the concrete formulation was prepared using 100 parts by weight of the anhydrite of Example 1, 1 part by weight of potassium sulphate, 1 part by weight of zinc sulphate heptahydrate, 150 parts by weight of 0/5 mm. siliceous sand, 60 parts by weight of 3/8 mm. siliceous sand, 90 parts by weight of 5/15 mm. siliceous gravel and 30 parts by weight of water. The molds were easily filled under vibration. After compression and unmolding, the fresh blocks were found to have sufficient rigidity for storage under conditions of Example 1. The mechanical properties in 28 days are 52 bars for bending strength and 348 bars in compression strength using the standard test of Example 1.

It will be apparent to those skilled in the art that variations may be made in the foregoing description of the preferred embodiment without departing from the scope of the invention disclosed.

What is claimed is:

1. A method of producing a building element which comprises blending 100 parts by weight of anhydrite binder, 20 to 75 parts by weight of water, 0.05 to 5 parts by weight of at least one anhydrite setting catalyst and 300 to 900 parts by weight of heavy granulates, inserting the composition into a mold, and permitting the composition to cure.

2. The method according to claim 1 in which the anhydrite binder comprises at least about 15% by weight of particles having a diameter of less than about 10 microns and at least about 20% by weight of particles having a diameter greater than about 20 microns with an average diameter between about 5 and 30 microns.

3. The method according to claim 1 wherein the anhydrite setting catalyst is chosen in the group constituted by metal sulphates, alums, nitrates, carbonates and hydroxides.

4. The method according to claim 1 in which the anhydrite setting catalyst is potassium sulphate.

5. The method of claim 1 wherein the heavy granulates have a size in the range greater than 0 to about 15 mm.

6. An anhydrite concrete which comprises 100 parts by weight of anhydrite binder, 0.5 to 5 parts by weight of at least one anhydrite setting catalyst, 300 to 900 parts by weight heavy granulates and 20 to 75 parts by weight water.

7. The anhydrite concrete of claim 6 wherein the heavy granulates have a size greater than 0 to about 15 mm.

8. The anhydrite concrete of claim 6 wherein the anhydrite setting catalyst is chosen in the group constituted by metal sulphates, alums, nitrates, carbonates, and hydroxides.

9. The anhydrite concrete of claim 6 wherein the anhydrite setting catalyst in potassium sulphate.

* * * * *

UNITED STATES PATENT AND TRADEMARK OFFICE
CERTIFICATE OF CORRECTION

PATENT NO. : 4,166,750
DATED : September 4, 1979
INVENTOR(S) : Robert Koeppel

It is certified that error appears in the above-identified patent and that said Letters Patent are hereby corrected as shown below:

Foreign Application Priority Data:

reads "Jan. 14, 1977 [FR] France 77 01016", should read
        --Jan. 18, 1977 [FR] France 77 01303--

Column 4, line 66, reads "0.05 to 5 parts", should read
                        --0.5 to 5 parts--

Signed and Sealed this

Fourth Day of March 1980

[SEAL]

*Attest:*

SIDNEY A. DIAMOND

*Attesting Officer*      *Commissioner of Patents and Trademarks*